US009916005B2

(12) United States Patent
Aronsson

(10) Patent No.: US 9,916,005 B2
(45) Date of Patent: Mar. 13, 2018

(54) GAZE TRACKING WITH PROJECTOR

(71) Applicant: Pär-Anders Aronsson, Lund (SE)

(72) Inventor: Pär-Anders Aronsson, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 0 days.

(21) Appl. No.: 13/979,152

(22) PCT Filed: Jan. 3, 2013

(86) PCT No.: PCT/IB2013/050058
§ 371 (c)(1),
(2) Date: Jul. 11, 2013

(87) PCT Pub. No.: WO2013/117999
PCT Pub. Date: Aug. 15, 2013

(65) Prior Publication Data
US 2014/0354514 A1 Dec. 4, 2014

Related U.S. Application Data

(60) Provisional application No. 61/595,641, filed on Feb. 6, 2012.

(51) Int. Cl.
*G02B 27/01* (2006.01)
*H04N 13/04* (2006.01)
(Continued)

(52) U.S. Cl.
CPC .......... *G06F 3/013* (2013.01); *G02B 27/017* (2013.01); *G02B 27/0172* (2013.01);
(Continued)

(58) Field of Classification Search
CPC .............. G02B 27/0172; G02B 27/017; G02B 27/0093; G02B 2027/014;
(Continued)

(56) References Cited

U.S. PATENT DOCUMENTS 5,220,361 A * 6/1993 Lehmer .................. A61B 3/113
351/210
6,414,681 B1 7/2002 Ohshima et al.
(Continued)

FOREIGN PATENT DOCUMENTS

CN 101336089 A 12/2008
WO 2007085682 A1 8/2007

OTHER PUBLICATIONS

International Preliminary Report on Patentability; dated Aug. 21, 2014; issued in International Patent Application No. PCT/IB2013/050058.
(Continued)

*Primary Examiner* — Dismery Mercedes
(74) *Attorney, Agent, or Firm* — James C. Edwards; Moore & Van Allen PLLC

(57) ABSTRACT

The invention is directed to systems, methods and computer program products for gaze tracking. An exemplary method includes directing light into an eye using a projector; detecting, using an image-capturing module, a reflection from a surface associated with the eye; and determining a line of sight associated with the eye based on the detected reflection. In some embodiments, the light comprises infra-red light. In some embodiments, the projector comprises a laser. In some embodiments, the projector comprises a liquid crystal on silicon (LCoS) chip. In some embodiments, the surface associated with the reflection is at least one of the cornea, the iris, or the retina.

17 Claims, 3 Drawing Sheets

(51) Int. Cl.
*G06F 3/01* (2006.01)
*G06T 19/00* (2011.01)
*H04N 13/00* (2018.01)

(52) U.S. Cl.
CPC ....... *G06T 19/006* (2013.01); *H04N 13/0022* (2013.01); *H04N 13/044* (2013.01); *H04N 13/0484* (2013.01); *G02B 2027/0138* (2013.01); *G02B 2027/0178* (2013.01); *G02B 2027/0185* (2013.01); *G02B 2027/0187* (2013.01); *G06T 2207/30041* (2013.01)

(58) Field of Classification Search
CPC .... G02B 2027/0178; G02B 2027/0185; G02B 2027/0187; G02B 2027/013; G02B 2027/0138; G06F 3/013; H04N 13/0484; H04N 13/0022; H04N 13/0472; H04N 13/044; H04N 2213/008; G06T 19/006; G06T 2207/30041
See application file for complete search history.

(56) References Cited

U.S. PATENT DOCUMENTS

| | | | | |
|---|---|---|---|---|
| 7,401,920 | B1* | 7/2008 | Kranz | A61B 3/113 351/209 |
| 7,533,989 | B2* | 5/2009 | Ebisawa | A61B 3/113 351/208 |
| 7,580,545 | B2* | 8/2009 | Venkatesh | G06K 9/00604 382/103 |
| 7,686,451 | B2* | 3/2010 | Cleveland | A61B 3/113 351/210 |
| 8,810,642 | B2* | 8/2014 | Tsukizawa | G06K 9/00604 348/78 |
| 8,929,589 | B2* | 1/2015 | Publicover | G06K 9/00604 382/103 |
| 9,237,844 | B2* | 1/2016 | De Bruijn | A61B 3/113 |
| 2005/0175218 | A1* | 8/2005 | Vertegaal | A61B 3/113 382/103 |
| 2005/0195277 | A1* | 9/2005 | Yamasaki | G02B 27/017 348/61 |
| 2006/0110008 | A1* | 5/2006 | Vertegaal | G06K 9/00604 382/103 |
| 2006/0239670 | A1* | 10/2006 | Cleveland | A61B 3/113 396/51 |
| 2007/0014552 | A1* | 1/2007 | Ebisawa | G06K 9/00604 396/51 |
| 2007/0279590 | A1* | 12/2007 | Ebisawa | A61B 3/113 351/208 |
| 2009/0289956 | A1 | 11/2009 | Douris et al. | |
| 2010/0110368 | A1* | 5/2010 | Chaum | G02B 27/017 351/158 |
| 2010/0149073 | A1* | 6/2010 | Chaum | G02B 27/0093 345/8 |
| 2011/0007277 | A1* | 1/2011 | Solomon | G02B 26/105 353/7 |
| 2011/0109880 | A1 | 5/2011 | Nummela | |
| 2011/0221656 | A1* | 9/2011 | Haddick et al. | 345/8 |
| 2011/0249868 | A1* | 10/2011 | Tsukizawa | A61B 3/113 382/103 |
| 2012/0050516 | A1* | 3/2012 | Tsukizawa | G06K 9/00604 348/78 |
| 2012/0068913 | A1* | 3/2012 | Bar-Zeev | G02B 26/026 345/8 |
| 2012/0177266 | A1* | 7/2012 | Tsukizawa | A61B 3/113 382/128 |
| 2012/0212398 | A1* | 8/2012 | Border | G02B 27/017 345/8 |
| 2012/0280956 | A1* | 11/2012 | Yamamoto | G02B 26/101 345/204 |
| 2013/0050642 | A1* | 2/2013 | Lewis | A61B 3/113 351/204 |
| 2013/0154918 | A1* | 6/2013 | Vaught et al. | 345/156 |
| 2013/0187835 | A1* | 7/2013 | Vaught et al. | 345/8 |

OTHER PUBLICATIONS

International Search Report and Written Opinion of the International Searching Authority; dated Apr. 29, 2013; issued in International Patent Application No. PCT/IB2013/050058.
European Patent Office; Communication Pursuant to Article 94(3) EPC; dated Oct. 23, 2015; issued in European Patent Application No. 13705010.0.
State Intellectual Property Office, P.R. China; dated Apr. 5, 2016; First Office Action; issued in Chinese Patent Application No. 201380008249.0.
Hammoud, Riad I.; "Passive Eye Monitoring. Algorithms, Applications and Experiments"; Passive eye monitoring: algorithms, applications and experiments; Jan. 1, 2008; pp. 117-120, XP055285667; Berlin, DE ISBN: 978-3-540-75411-4.
European Patent Office; Communication pursuant to Article 94(3) EPC; Jul. 11, 2016; issued in European Patent Application No. 13705010.0.
State Intellectual Property Office, P.R. China; Second Office Action; dated Nov. 28, 2016; issued in Chinese Patent Application No. 201380008249.0.
State Intellectual Property Office, P.R. China; Third Office Action; dated Mar. 31, 2017; issued in Chinese Patent Application No. 201380008249.0.

* cited by examiner

GAZE TRACKING WITH PROJECTOR

BACKGROUND

As presented in FIG. 1, the important parts of a human eye 100 include the cornea 110, the iris 120, the pupil 130, the lens 135, the retina 140, and the optic nerve 150. The cornea 110 is the clear outer bulging surface at the front of the eye. The cornea 110 is the major refractive surface of the eye. The iris 120 is the colored part of the eye that regulates an amount of light entering the eye. The pupil 130 is the opening at the center of the iris 120. The iris 120 modifies or adjusts the size of the pupil 130 and thereby controls the amount of light that enters the eye. The lens 135 is the clear part of the eye behind the iris 120 that focuses light on the retina 140. The retina 140 is a light-sensitive tissue lining at the back of the eye. The retina 140 transforms light into electrical signals that are transmitted to the brain via the optic nerve. The aqueous humor 160 is a gelatinous fluid that is located in the space between the lens 135 and the cornea 110. The function of the aqueous humor 160 is to maintain the intraocular pressure and inflate the globe of the eye.

Gaze tracking is the process of tracking the point of gaze (the line of sight associated with an eye or what an eye is looking at) over a period of time. At a basic level, gaze tracking includes the steps of illuminating the eye using a light source, thereby causing visible reflections from various boundaries of the eye. Some of these reflections may be referred to as Purkinje images. One type of visible reflection that is tracked is the glint. The glint is the small amount of light that is reflected by the cornea. The glint may also be referred as the first Purkinje image.

As used herein, gaze tracking may include the steps of generating the reflection and tracking the reflection. The step of generating the reflection may be performed using discrete infrared (IR) light sources, e.g., discrete IR light-emitting diodes (LEDs) that are used to direct IR light into an eye. There are several advantages associated with using IR light for gaze tracking. IR light can illuminate an eye without disturbing a viewer. Additionally, IR light is reflected well by the cornea or by other parts of the eye (e.g., the pupil), and consequently, the reflections are more easily detectable by an IR image-capturing module (e.g., an IR camera).

However, there are several disadvantages associated with using discrete IR LEDs to direct light into an eye. In systems where the distance from the image-capturing module to the eye is very small, reflections (e.g., the glint) may be difficult to detect and/or track with high precision as the reflections become larger. Additionally, an IR LED can occupy a substantial amount of space, and since space on a gaze tracking system may be limited, the system cannot accommodate several IR LEDs when several IR LEDs are required. Additionally, when a system needs to accommodate several IR LEDs, each LED needs to be separated by at least a predetermined distance in order to enable the reflection (e.g., the glint) to fall within the spherical part of the cornea. When the space on a system is limited, the system cannot accommodate several LEDs because the limited space prevents each LED from being separated from another LED by the predetermined distance. Additionally, the angular range over which the direction of a gaze can be tracked is small because eye movement causes the reflection (e.g., the glint) to fall outside the spherical part of the cornea, which makes the detection of the reflection less reliable.

Therefore, what is needed is a system for gaze tracking that overcomes these disadvantages.

BRIEF SUMMARY

Embodiments of the invention are directed to systems, methods and computer program products for gaze tracking. In some embodiments, the method comprises directing light into an eye using a projector; detecting, using an image-capturing module, at least one reflection from at least one surface associated with the eye; and determining a line of sight associated with the eye based on the detected reflection. In some embodiments, the light comprises infra-red light. In some embodiments, the projector comprises a laser. In some embodiments, the projector comprises a liquid crystal on Silicon (LCoS) chip. In some embodiments, the at least one surface associated with the reflection is at least one of the cornea, the pupil, the iris, or the retina associated with the eye.

In some embodiments, the projector and the image-capturing module are comprised within a head-mounted device. In some embodiments, the head-mounted device comprises at least one of glasses, a visor, or a helmet.

In some embodiments, the light forms a pattern. As used herein, a pattern refers to an image. The terms "image" and "pattern" are equivalent. In some embodiments, the pattern has a quadrilateral shape. In some embodiments, the projector comprises a non-transitory memory, the memory storing at least one pattern, and wherein the projector selects a pattern or selects a projection position for the pattern based at least partially on a distance of at least a portion of the eye from the portion's substantially central position. In some embodiments, the memory may be housed in a device separate from the projector. In some embodiments, a substantially central position associated with a portion of an eye (e.g., a pupil, a retina, etc.) refers to the position of the portion of the eye when the viewer is looking at or focusing substantially straight ahead at an object that is situated far away or at infinite distance.

In some embodiments, the method further comprises determining a position of a pupil or at least a portion of a pupil (e.g., a substantially central portion of the pupil).

In some embodiments, the method further comprises modifying at least one of a size of the at least one reflection, a shape associated with the at least one reflection, an intensity associated with the at least one reflection, or a quantity of reflections.

In some embodiments, a head-mounted device comprises a display, and the method further comprises projecting, using the projector, an image onto the display.

In some embodiments, the method further comprises adjusting the image based at least partially on an inter-pupillary distance between the eye and a second eye.

In some embodiments, a head-mounted system for gaze tracking comprises: at least one display; a first projector for directing light into a first eye and for projecting a first image onto the at least one display; and a first image-capturing module for: detecting at least one reflection from at least one surface associated with the first eye, and determining a line of sight associated with the first eye based on the detected reflection.

In some embodiments, the system further comprises a second projector for directing light into a second eye and for projecting a second image onto the at least one display; and a second image-capturing module for: detecting at least one reflection from at least one surface associated with the second eye, and determining a line of sight associated with the second eye based on the detected reflection.

In some embodiments, the first image-capturing module determines a substantially central portion associated with the first eye, and wherein the second image-capturing module determines a substantially central portion associated with the second eye.

In some embodiments, the system further comprises a processor that determines a distance between the first eye's pupil and the second eye's pupil based at least partially on the determined substantially central portion associated with the first eye and the determined substantially central portion associated with the second eye.

In some embodiments, the first projector adjusts the first image based at least partially on an inter-pupillary distance between the first eye and the second eye, and wherein the second projector adjusts the second image based at least partially on the inter-pupillary distance.

In some embodiments, a method for adjusting an image on at least one display associated with a head-mounted system comprises: using a first projector for projecting a first image onto the at least one display; using a second projector for projecting a second image onto the at least one display; using a first image-capturing module for determining a substantially central portion associated with a first eye; using a second image-capturing module for determining a substantially central portion associated with a second eye; determining a distance between the first eye and the second eye based at least partially on the determined substantially central portion associated with the first eye and the determined substantially central portion associated with the second eye; adjusting the first image based at least partially on the determined distance between the first eye and the second eye; and adjusting the second image based at least partially on the determined distance between the first eye and the second eye. In some embodiments, the first projector projects the first image and the second projector projects the second image onto a substantially live view of a real-world environment.

BRIEF DESCRIPTION OF THE DRAWINGS

Figure 1:
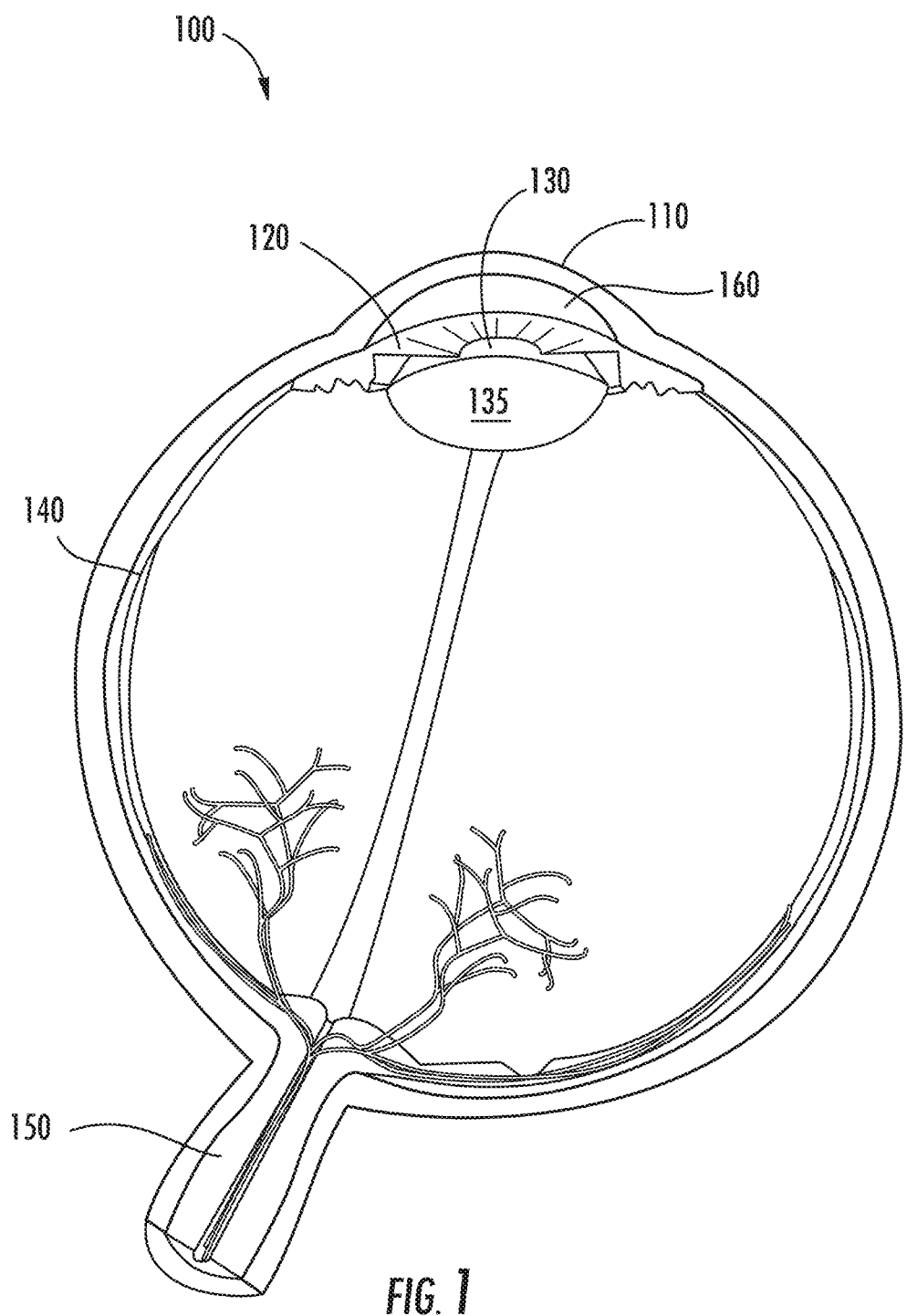
Figure 2:
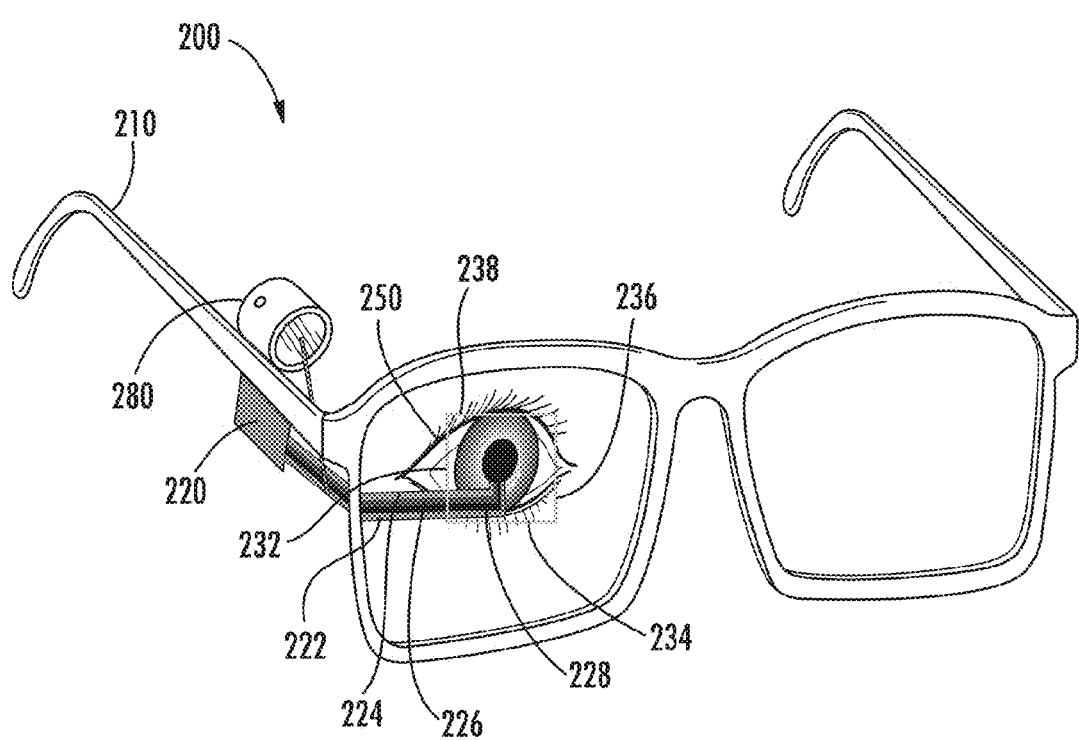
Figure 3:
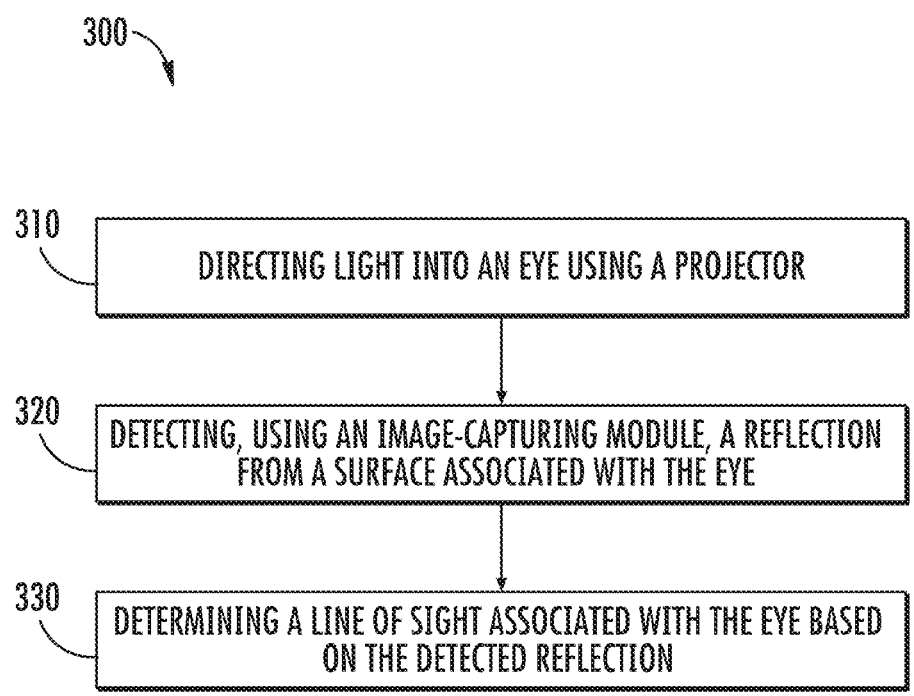

Having thus described embodiments of the invention in general terms, reference will now be made to the accompanying drawings, where:

FIG. 1 is a cross-sectional view illustrating an eye;

FIG. 2 is a perspective view illustrating an exemplary system, in accordance with one embodiment of the present invention; and FIG. 3 is flow diagram illustrating an exemplary process flow for performing gaze tracking, in accordance with one embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The invention is directed to systems, methods and computer program products for gaze tracking using non-contact optical techniques. As used herein, a non-contact technique is a technique where the gaze tracking system is not in physical contact with the eye. An exemplary method includes directing light into an eye using a projector; detecting, using an image-capturing module, a reflection from a surface associated with the eye (e.g., the glint); and determining a line of sight associated with the eye based on the detected reflection.

In some embodiments, gaze tracking may be performed by tracking various characteristics associated with the glint (e.g., distance, direction, and orientation of the glint with respect to a gaze tracking system, e.g., a light source and/or an image-capturing module). In some embodiments, an orientation as described herein may include at least one of an azimuth, an elevation, or a tilt associated with the glint. In other embodiments, gaze tracking may be performed by tracking both the glint and the position of the eye's pupil or the substantially central portion of the eye's pupil. In still other embodiments, gaze tracking may be performed by tracking the glint and a reflection from the pupil (or a reflection from any other surface or boundary of an eye). In such embodiments, a vector formed by the angle between the glint and the pupil reflection (or a reflection from any other surface or boundary of an eye) may be combined with other geometrical data to determine the gaze direction.

In further embodiments (e.g., a dual-Purkinje gaze tracking system), gaze tracking may be performed by tracking one or more reflections from the front of the cornea (the glint or the first Purkinje image) and from the back of the lens of the eye (the fourth Purkinje image). In such embodiments, data associated with both reflections may be used to determine the gaze direction.

In still further embodiments, gaze tracking may be performed by tracking and/or imaging (i.e., generating an image of) features inside the eye (e.g., the retinal blood vessels). In some embodiments, an image-capturing module described herein has the ability to continue to track and image these features while the eye or various parts of the eye move or rotate. In such embodiments, the image-capturing module may or may not track reflections from the retina. In embodiments where reflections are tracked, the image-capturing module detects, tracks, and images reflections from the retina (or the retinal blood vessels) or changes in reflections from the retina (or the retinal blood vessels) over a period of time.

Embodiments of the present invention are not limited to any particular method to determine the gaze direction. Additionally, in embodiments where the gaze tracking system supports multiple gaze tracking embodiments, the gaze tracking system may allow a user to switch between the various modes. When the gaze tracking system switches between modes, the gaze tracking system may automatically configure itself to perform gaze tracking using the selected mode. For example, when the gaze tracking system shifts from a mode associated with tracking reflections from one or more parts of an eye to a mode associated with tracking and imaging features inside the eye (e.g., retinal blood vessels), the image-capturing module may be configured to automatically change its focus to support the selected mode. In other embodiments, a combination of one or more of the above-described embodiments may be used to determine the gaze direction.

Although gaze tracking is described herein as tracking the glint, embodiments of the invention are not limited to tracking the glint. Embodiments of the invention are directed to tracking a reflection associated with any surface or boundary associated with the eye (e.g., a boundary or surface other than the cornea). Therefore, as used herein, the glint may refer to a reflection from the surface of the cornea or any other surface or boundary associated with the eye presented in FIG. 1.

As used herein, a system for gaze tracking includes both a light source and an image-capturing module. In some embodiments, the light source shines IR light onto an eye; however, embodiments of the invention are not limited to any particular type (or frequencies) of light that can be shone onto the eye. In some embodiments, the light source and the image-capturing module are included in the same system, e.g., a system that comprises a single housing. In alternate embodiments, the light source and the image-capturing module are included in separate systems or separate housings.

An image-capturing module as described herein may include a camera or any component capable of capturing an image or a stream of images (video). The image-capturing module may be a digital camera or a digital video camera. Additionally, the image-capturing module may provide for automatic and/or manual adjustment of a camera setting (e.g., the focus setting). In some embodiments, the image-capturing module comprises an optical sensor in addition to or instead of a camera. The image-capturing module may detect one or more reflections (or change in reflections) from various surfaces associated with an eye, analyze data associated the one or more reflections, and determine the gaze direction based at least partially on the analyzed data.

The image-capturing module described herein may focus on just a single eye or may focus on both eyes and detect and/or record the movement of an eye as the viewer looks at a stimulus. As used herein, a user or viewer of the gaze tracking system may be equivalent. Additionally, the image-capturing module may use one or more techniques to locate or track the pupil or the center (or a substantially central portion) of the pupil. For example, the image-capturing module may use infra-red (IR) or near-IR non-collimated light to generate a reflection associated with the cornea or associated with any other part of the eye (e.g., the lens). In some embodiments, the image-capturing module may generate a vector between the center (or a substantially central portion) of the pupil and the generated reflection in order to determine the gaze direction.

A gaze tracking system (or an image-capturing module associated with a gaze tracking system) described herein enables both bright pupil and dark pupil tracking in order to determine the location of the pupil or the center of the pupil. The difference between bright pupil tracking and dark pupil tracking is the location of the light source with respect to the optical path. If the light source is coaxial with the optical path, the eye acts as a retroreflector as light reflects from the retina thus rendering a bright pupil effect. As used herein, a retroreflector is a surface that reflects light back to its source with minimal scattering of light. If the light source is offset from the optical path, the pupil appears dark because retroreflection from the retina is directed away from the image-capturing module. Therefore, an image-capturing module described herein enables either bright pupil tracking or dark pupil tracking based at least partially on whether a light source described herein is coaxial with or offset from the optical path. As used herein, the optical path is a path that light takes in traversing the gaze tracking system.

Referring now to FIG. 2, FIG. 2 presents an exemplary system 200 for performing gaze tracking. In some embodiments, the exemplary system may be a visor or glasses as presented in FIG. 2. In some embodiments, the light source 220 and the image-capturing module 280 may be positioned on a single side of the exemplary system. In other embodiments, a light source 220 and image-capturing module 280 pair are positioned on either side of the exemplary system. In still other embodiments, a light source 220 may be positioned on one side of the exemplary system, while the image-capturing module 280 is positioned on the other side of the exemplary system. Embodiments of the invention are not limited to positioning the light source 220 and/or the image-capturing module 280 at any particular position on the exemplary system.

A light source 220 may be used for shining or directing light into the eye, thereby generating reflections from at least one surface or boundary associated with the eye. Additionally or alternatively, the light source 220 may be used for lighting or illuminating the surface of the eye, or one or more parts of the eye. Illuminating the surface of the eye may be useful for the purpose determining the location of the pupil or the center of (or a substantially central portion of) the pupil. Additionally or alternatively, the light source may be used to illuminate the retina for the purpose of detecting and imaging placement (and/or change in characteristics) of retinal blood vessels. The illumination of the retina may be useful in an embodiment where the retinal blood vessels are tracked and/or imaged in order to determine the gaze direction.

A light source 220 as described herein may be a projector. The projector may be a projector associated with presenting overlay information on a mobile display in an augmented reality (AR) system. As used herein, augmented reality (AR) refers to a view (e.g., live view or a delayed view) of a real-world environment where elements of the real-world environment are augmented by computer-generated input such as images, sound, etc. Therefore, the projector (and the gaze tracking system described herein) may be included in a head mounted display (HMD) system, and the projector may be used to project an image onto the display of the HMD system. A head mounted display or helmet mounted display (HMD) system is a display system that may be worn on the head. An HMD system may take the form of eye-glasses, a visor, a facemask, or a helmet, though an HMD system is not limited to these forms. The HMD system may include a display unit in front of only one eye (monocular HMD) or a display unit in front of each eye (binocular HMD). The display unit may be based on cathode ray tube (CRT), liquid crystal display (LCD), liquid crystal on Silicon (LCoS), light-emitting diode (LED), organic light-emitting diode (OLED), etc. Embodiments of the invention are not limited to any particular display technology. An HMD as described herein may display a computer generated image, a live or delayed image from the real world, or a combination of both images.

In some embodiments, a projector as described herein may comprise at least one IR LED (which produces IR light 222) in addition to the red green blue (RGB) LEDs (which produce red 226, green 224, and blue 228 light). In other embodiments, the projector may include only one or more IR LEDs, and not include RGB LEDs. A control module that is included in the gaze tracking system may be configured to individually control the emission associated with each of the IR LEDs and each of the RGB LEDs. In some embodiments, the control module may modify the intensity of emission associated with each type of LED (e.g., the IR LED) based on the movement of an eye and/or movement of the head (e.g., based on a distance of the eye or the pupil from a substantially central position). Additionally, in some embodiments, the control module may adjust which LEDs are active and which LEDs are inactive based on the movement of an eye and/or movement of the head (e.g., based on a distance of the eye or the pupil from a substantially central position).

In some embodiments, movement of an eye refers to movement of a portion of an eye. As used herein, a portion of an eye may also be referred to as a part of an eye. In some embodiments, a substantially central position associated with a portion or part of an eye (e.g., a pupil, a retina, iris, etc.) refers to the position of the portion or part of the eye when the viewer is looking at or focusing substantially straight ahead at an object that is situated far away or at infinite distance.

As used herein, a projector is an optical system that projects light (e.g., IR light defining one or more IR patterns) onto the eye 250. Embodiments of the invention are not limited to patterns associated with any particular shape. Additionally, the patterns can be modified by a user of the gaze tracking system. Each pattern may produce a reflection (or reflections) associated with a particular shape. Therefore, the projector projects light onto the eye such that the reflection of the light from various surfaces of the eye can have any of a number of shapes. Embodiments of the invention are not limited to reflections associated with any particular shape. For example, the projector's shining of light into the eye results in four reflections (e.g., four glints) in a quadrilateral formation. The quadrilateral reflection formation produces a more reliable determination of how an eye (or a pupil associated with the eye) move compared to light sources that cause generation of one or two reflections. An illustration of a quadrilateral reflection pattern 232, 234, 236, and 238 is presented in FIG. 2. In other embodiments, the reflections may take the form of other shapes, e.g., elliptical, circular, triangular, polygonal, etc. Additionally, the projector can control the number of distinct reflections (e.g., four reflections as in FIG. 2) that are produced when the projector's light is directed into the eye. Embodiments of the invention are not limited to a minimum or maximum number (or quantity) of reflections that can be generated using the gaze tracking system described herein.

Additionally, a memory associated with the projector may be used to store at least one pattern. The projector may be automatically configured to use a different pattern based at least partially on the distance of the eye (or a part of the eye such as the pupil) from a substantially central position. Therefore, the projector (or some other component in the gaze tracking system such as the image-capturing module or a processor) has the ability to measure the distance of the eye (or a part of the eye such as the pupil) from its substantially central position, and compare the measured distance with one or more predetermined thresholds. In response to determining the measured distance is greater than a first threshold, the projector may project a first type of pattern onto the eye. In response to determining the measured distance is not greater than the first threshold, the projector may project a second type of pattern onto the eye. Each type of pattern results in a different shape for the reflection associated with a surface of the eye. In some embodiments, the image-capturing module measures the distance of the eye (or a part of the eye such as the pupil) from its substantially central position, and communicates this information to a processor or directly to the projector. Subsequently, the processor or the projector selects the type of pattern based on the measured distance.

Additionally, the projector may automatically modify the placement of (or modify the projection position of) the pattern on the eye based on a position of a pupil with respect to a fixed position. The modification of the placement of the pattern on the eye causes generation of high-quality reflections (e.g., glints) that are easily detectable by an image-capturing module described herein. Therefore, the projector (or some other component in the gaze tracking system such as the image-capturing module or a processor) has the ability to measure the distance of the pupil with respect to a fixed position (e.g., a substantially central rest position associated with the pupil), and compare the measured distance with one or more predetermined thresholds. In response to determining the measured distance is greater than a first threshold, the projector may project a first selected pattern onto a first portion of the eye. In response to determining the measured distance is not greater than the first threshold, the projector may project a second selected pattern onto a second portion of the eye, wherein the second portion is different from the first portion. Additionally, the first selected pattern may or may not be different from the second selected pattern.

In embodiments described herein, the projector may also have the ability to simultaneously project separate patterns onto distinct parts of the eye. This enables generation of multiple distinct reflections, each reflection associated with a separate pattern that is directed into the eye. These multiple reflections may be useful in making a more accurate determination of the gaze direction. Additionally, in some embodiments, the projector may have the ability to direct patterns into an eye, wherein one or more characteristics (e.g., size, placement, intensity, shape, quantity, etc.) of the patterns change over a period of time. Thus, this enables generation of reflections that change characteristics over a period of time, and are therefore more easily detectable by an image-capturing module described herein.

Additionally, the type of pattern (and other characteristics associated with the pattern such as size, placement, intensity, shape, quantity, etc.) projected onto the eye may vary based at least partially on whether the user's head is substantially at rest or whether the user's head is in motion. Therefore, the projector described herein may determine whether the user's head is substantially at rest or whether the user's head is in motion, and may select the type of pattern (and other characteristics associated with the pattern such as size, placement, intensity, shape, quantity, etc.) to be projected onto the eye based on this determination. Thus, the gaze tracking system described herein enables determination of the gaze direction regardless of whether the user's head is still or moving.

The projector not only enables control of the shape of the reflection but also enable control of the size of the reflection. A projector as described herein uses one or more micro-display chips (e.g., LCoS chip, LCD chip, DLP chip, etc.). Each of these chips has a fixed array of pixels. As used herein, a pixel is the smallest addressable element on the projector. The projector can control the light intensity associated with the each pixel and can control the number of pixels that are configured to have a particular light intensity. By controlling the light intensity associated with each pixel and/or the number of pixels that are configured to have a particular light intensity, the projector enables control of the size of the reflection. For example, the size of the reflection is larger when a greater number of pixels have a higher intensity and/or when a fewer number of pixels have a lower intensity, and the size of the reflection is smaller when a greater number of pixels have a lower intensity and/or when a fewer number of pixels have a higher intensity.

Additionally, the projector also enables control of the intensity of a reflection. In some embodiments, the projector enables a user to manually control the intensity of the reflection by changing settings associated with the projector, while in other embodiments, the projector is configured to automatically control the intensity of the reflection in order to permit optimal detection or visualization of the reflection by the image-capturing module. In some embodiments, the projector is configured to automatically control the intensity (or contrast) of the reflection based at least partially on one or more environmental factors (e.g., brightness or amount of external light in the environment where the gaze tracking system is being used). Additionally, in some embodiments, the projector shines a low-intensity light over a substantial portion of the eye, thus enabling easier detection or visualization of the reflection by the image-capturing module.

In some embodiments, a projector described herein may be based on laser technology. A laser emits light through a process of optical amplification based on the stimulated emission of photons. Laser light has a high degree of spatial and temporal coherence. Therefore, a projector that includes a laser may be able to shine light onto particular parts of the eye (e.g., onto a particular part of the cornea) with greater accuracy. Thus, a projector with a laser may be able to shine light onto a particular part of an eye to produce a reflection that is optimally detectable (e.g., easier to detect) by the image-capturing module.

In other embodiments, a projector described herein may be based on Liquid Crystal on silicon (LCoS) technology. LCoS is a reflective technology that uses liquid crystals that are applied to a reflective mirror substrate. As liquid crystals open and close, light is reflected by the reflective mirror substrate. The modulation of light as the liquid crystals open and close creates an image. Therefore, the projector may include an LCoS chip. A projector that includes an LCoS chip may be used to direct a very high-resolution pattern into the eye. This high-resolution pattern results in the generation of a reflection that is optimally detectable (e.g., easier to detect) by the image-capturing module. As used herein, the term "resolution" refers to an amount of detail that is carried by either the pattern projected onto the eye or the reflection from a surface associated with the eye. Embodiments of the invention are not limited to any particular type of projector technology.

Embodiments of the invention permit transfer of images (e.g., patterns) from the projector to the image-capturing module. In some embodiments, an image-capturing module may compare the pattern (e.g., the pattern that the projector shines into the eye) with the detected reflection in order to determine the gaze direction. Embodiments of the invention are not limited to any particular mechanisms (e.g., wired mechanism or wireless mechanism such as near-field communication (NFC)) for transferring an image from the projector to the image-capturing module. Additionally, the image-capturing module may also transmit information to the projector via one or more wired or wireless mechanisms.

As indicated previously, the gaze capturing system may be included in a HMD system (e.g., a monocular or binocular HMD system). Embodiments of the invention are also directed to adjusting an image presented on a display of a HMD system based on determining a center or a substantially central portion of an eye. In some embodiments, the image presented on the HMD system is an image projected by the projector described herein. In some embodiments, the center of (or a substantially central portion of) the eye may refer to the location of the pupil or the center of (or a substantially central portion of) the pupil.

The adjustment described herein is useful in a HMD system that comprises an image-capturing module (e.g., a camera) positioned in front of each eye. Additionally, each image-capturing module may be associated with a corresponding projector. Each image-capturing module associated with the HMD system may be an image-capturing module described previously that detects one or more reflections from an eye and determines a gaze direction. Additionally, the image-capturing module is not limited to any particular types of image-capturing modules. For example, the image-capturing module may be an IR video camera, an RGB video camera, or any other type of camera that can detect the center or substantially central portion of the eye.

Different people have different placement of eyes and consequently different distances between their eyes. If the differences in eye placement are not considered in generating an image on an HMD system, a number of problems may arise. For example, when a person is watching three-dimensional (3-D) content on the HMD system, there may be errors associated with generating a stereoscopic effect if the distance between the two images presented on the HMD system does not take into account the inter-eye or inter-pupillary distance. Additionally, these errors associated with generating a stereoscopic effect may also cause the user of the HMD system to suffer from eye strain. As used herein, a stereoscopic effect refers to a user's perception of 3-D depth caused by presenting two offset images separately to the left and right eye of the viewer.

In some embodiments of the invention, an image-capturing module (e.g., a camera) associated with the HMD system may be positioned in front of each eye. Each image-capturing module may be configured to determine the placement of the center (or a substantially central portion) of the eye when the viewer is looking straight ahead and focusing on the scene, an object, or stimulus at a far or infinite distance. Each image-capturing module may be configured to transmit position information regarding the center (or a substantially central portion) of the eye to the projector associated with the image-capturing module. As described previously, the present invention is not limited to any particular transmission mechanism between the image-capturing module and the projector. Alternatively, each image-capturing module may be configured to transmit position information regarding the center (or a substantially central portion) of the eye to a processor associated with the HMD system. The processor may calculate an amount and/or type of adjustment to be made to each image, and transmits this adjustment information to each projector.

Using the position information associated with the center (or a substantially central portion) of an eye, each projector adjusts the image that it projects onto the display. Adjusting the image may comprise adjusting the position of the right image with respect to the left image in order to reduce or eliminate the stereoscopic effect errors, or adjusting the mixing of the right image with the left image in order to reduce or eliminate the stereoscopic effect errors. Adjusting the position of one image with respect to the other image may include adjusting the position of only one image or both images along at least one of the x-axis, the y-axis, or the z-axis. Additionally or alternatively, adjusting the image may also comprise adjusting the size of the image, adjusting the brightness of the image, adjusting the color or contrast of an image, etc.

Thus, the image projected onto the display is configured to suit the user's inter-eye or inter-pupillary distance. Therefore, embodiments of the invention enable automatically adjusting images produced on an HMD system by a projector. This invention eliminates the need for mechanically adjusting the projector or the HMD in order to adjust the projected image. Thus, an HMD system may be constructed according to the present invention that does not permit mechanical adjustment of the HMD system for the purpose of adjusting the projected image produced by the projector. Such an HMD system will be less complex, less heavy, and more aesthetically-pleasing when compared to an HMD system that is constructed to enable mechanical adjustment of the projected image produced by the projector.

Referring now to FIG. 3, FIG. 3 presents a process flow 300 for gaze tracking. The various process blocks presented in FIG. 3 may be executed in an order that is different from that presented in FIG. 3. At block 310, the exemplary method comprises directing light (e.g., IR light) into an eye using a projector. At block 320, the method comprises detecting or identifying, using an image-capturing module (e.g., a camera such as a digital video camera), at least one reflection from a surface (e.g., the cornea) associated with the eye. At block 330, the method comprises determining a line of sight (e.g., an angle with respect to a normal) associated with the eye based on the detected reflection. As used herein, a line of sight may refer to an angular direction associated with the user's gaze. The angular direction may be an angle with respect to a normal or a plane.

In some embodiments, the various systems described herein may comprise at least one processor, at least one memory, and at least one module stored in the memory that is executable to perform or to cause one or more other modules to perform the various processes described herein.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

In some embodiments, an exemplary computer program product for at least one of gaze tracking or adjusting an image on a display of a head-mounted system comprises a non-transitory computer readable medium comprising code configured to perform one or more processes described herein.

As used herein, the term "automatic" refers to a function, a process, a method, or any part thereof, which is executed by computer software upon occurrence of an event or a condition without intervention by a user. As used herein, the phrase "greater than" means "greater than or equal to."

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for gaze tracking, the method comprising:
   directing light onto an eye using a projector, the light forming a pattern;
   determining a position of at least a portion of a pupil of the eye;
   determining, based on the position, a distance of the at least a portion of the pupil of the eye from a substantially central position;
   comparing the determined distance to a predetermined threshold distance;
   projecting, by the projector, one of (i) a first type of pattern onto the eye based on the determined distance being greater than the predetermined threshold distance and (ii) a second type of pattern onto the eye based on the determined distance being less than or equal to the predetermined threshold, wherein each type of pattern results in a different shape for a reflection associated with a surface of the eye;
   in response to projecting the first type of pattern or second type pattern onto the eye, detecting, using an image-capturing module, at least one reflection from at least one surface associated with the eye; and
   determining a line of sight associated with the eye based on the detected reflection, wherein the line of sight is an angular direction associated with a gaze of the eye.

2. The method of claim 1, wherein the light comprises infra-red light.

3. The method of claim 1, wherein the projector comprises at least one of a laser or a liquid crystal on silicon (LCoS) chip.

4. The method of claim 1, wherein the image-capturing module comprises at least one of a camera or an optical sensor.

5. The method of claim 1, wherein the at least one surface comprises at least one of a cornea, a retina, an iris, or a lens associated with the eye.

6. The method of claim 1, wherein the projector and the image-capturing module are comprised within a head-mounted device.

7. The method of claim 6, wherein the head-mounted device comprises at least one of glasses, a visor, or a helmet.

8. The method of claim 6, wherein the head-mounted device comprises a display, and wherein the method further comprises projecting, using the projector, an image onto the display.

9. The method of claim 8, further comprising adjusting the image based at least partially on an inter-pupillary distance between the eye and a second eye.

10. The method of claim 1, wherein the pattern has a quadrilateral shape that defines the type of pattern prior to adjusting the type pf pattern.

11. The method of claim 1, wherein the projector comprises a non-transitory memory, the memory storing a plurality of pattern types.

12. The method of claim 1, further comprising:
    modifying at least one of a size of the at least one reflection, a shape associated with the at least one reflection, an intensity associated with the at least one reflection, or a quantity of reflections.

13. A head-mounted system for gaze tracking, the system comprising:
    at least one display;
    a first projector for directing a pattern of light onto a first eye and for projecting a first image onto the at least one display; and
    a first image-capturing module for:
    (a) determining a position of at least a portion of a pupil of the first eye,
    (b) determining, based on the position, a distance of the at least a portion of the pupil of the first eye from a substantially central position,
    (c) comparing the determined distance to a predetermined threshold distance,
    (d) communicating a signal to the first projector to project one of (i) a first type of pattern onto the first eye based on the determined distance being greater than the predetermined threshold distance and (ii) a second type of pattern onto the eye based on the determined distance being less than or equal to the predetermined threshold, wherein each type of pattern results in a different shape for a reflection associated with a surface of the eye,
    (e) in response to the first projector projecting the first type of pattern or second type pattern onto the first eye, detecting at least one reflection from at least one surface associated with the first eye, and (f) determining a line of sight associated with the first eye based on the detected reflection, wherein the line of sight is an angular direction associated with a gaze of the eye.

14. The system of claim 13, further comprising:
a second projector for directing light onto a second eye and for projecting a second image onto the at least one display; and
a second image-capturing module for:
(a) determining a position of at least a portion of a pupil of the second eye,
(b) determining, based on the position, a distance of the at least a portion of the pupil of the second eye from a substantially central position,
(c) comparing the determined distance to the predetermined threshold distance,
(d) communicating a signal to the second projector to project one of (i) the first type of pattern onto the second eye based on the determined distance being greater than the predetermined threshold distance, and (ii) the second type of pattern onto the eye based on the determined distance being less than or equal to the predetermined threshold,
(e) in response to the second projector projecting the first type of pattern or second type pattern, detecting at least one reflection from at least one surface associated with the second eye, and
(f) determining a line of sight associated with the second eye based on the detected reflection, wherein the line of sight is an angular direction associated with a gaze of the eye.

15. The system of claim 14, wherein the first image-capturing module determines a substantially central portion associated with the first eye, and wherein the second image-capturing module determines a substantially central portion associated with the second eye.

16. The system of claim 15, further comprising a processor that determines a distance between the first eye's pupil and the second eye's pupil based at least partially on the determined substantially central portion associated with the first eye and the determined substantially central portion associated with the second eye.

17. The system of claim 16, wherein the first projector adjusts the first image based at least partially on an inter-pupillary distance between the first eye and the second eye, and wherein the second projector adjusts the second image based at least partially on the inter-pupillary distance.

* * * * *